Figure 1:
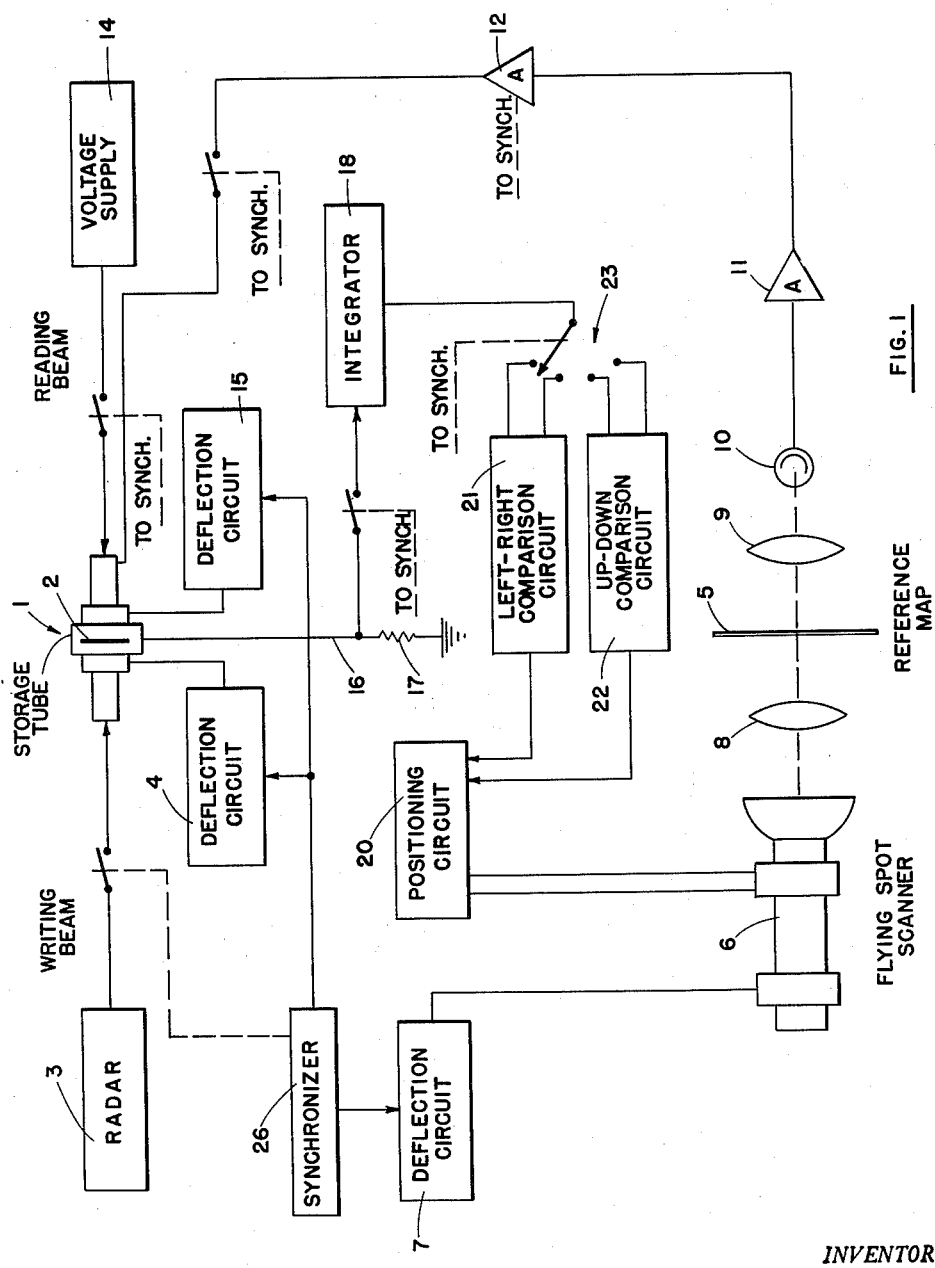

Aug. 27, 1963     J. B. MIHELICH     3,102,260
APPARATUS FOR COMPARING MAPS
Filed Nov. 3, 1951     2 Sheets-Sheet 1

INVENTOR.
JOSEPH B. MIHELICH
BY
William L. Lane
ATTORNEY

Aug. 27, 1963 J. B. MIHELICH 3,102,260
APPARATUS FOR COMPARING MAPS
Filed Nov. 3, 1951 2 Sheets-Sheet 2
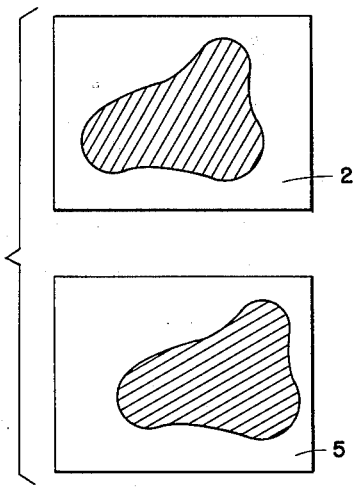
FIG. 2
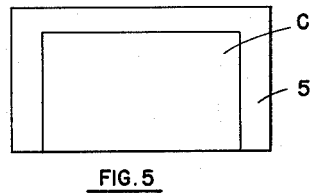
FIG. 5
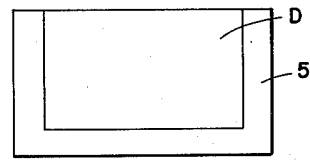
FIG. 6
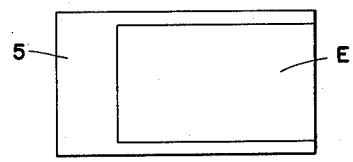
FIG. 7
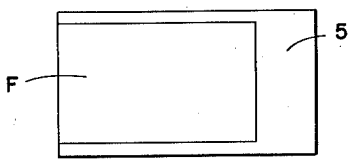
FIG. 8
FIG. 3
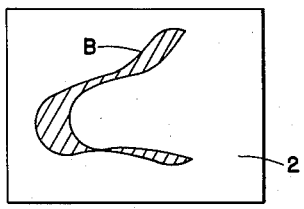
FIG. 4
INVENTOR.
JOSEPH B. MIHELICH
BY
William R. Lane
ATTORNEY

United States Patent Office 3,102,260
Patented Aug. 27, 1963

3,102,260
APPARATUS FOR COMPARING MAPS
Joseph B. Mihelich, Inglewood, Calif., assignor to
North American Aviation, Inc.
Filed Nov. 3, 1951, Ser. No. 254,764
10 Claims. (Cl. 343—5)

This invention provides an apparatus for determining the position of one map relative to another map.

This invention more particularly relates to an all electronic apparatus for determining the relative position of a radar map to a reference map.

An object of this invention is to determine the relative position of two maps.

Another object of this invention is to supply a useable voltage output proportional to the amount of mismatch between two maps.

A further object of this invention is to compare the relative position of two maps by an all electronic method.

An additional object of this invention is to provide an apparatus that will automatically match two maps.

Still another object of this invention is to provide a method of matching maps that is characterized by its reliability and extreme accuracy.

These and other objects will become apparent from the following detailed description taken in connection with the accompanying drawings in which:

FIG. 1 is a diagram of the apparatus of the invention,
FIG. 2 shows a reference map and a radar map on a storage plate,
FIG. 3 shows the reference map superimposed on the radar map,
FIG. 4 shows the storage plate after having been scanned by the reading beam,
FIGS. 5, 6, 7 and 8 show four different positions of the flying spot scanner raster in scanning the reference map.

This invention provides an apparatus for matching and comparing two maps which are ordinarily a radar map and a reference map. It is possible from this invention to determine if the radar map is indicating the same pattern as is indicated on the reference map, and is operable when the two maps show approximately the same thing.

The apparatus is comprised of a suitable electric storage device such as graphechon storage tube 1 which includes a storage plate 2. A radar 3 is connected with one end of the graphechon tube, plus a suitable deflection circuit 4 connected with the same side of the tube, so that a writing beam thus scans the area of one side of storage plate 2 and writes on the storage plate in terms of an electric charge a map of what the radar detects. Thus the storage plate will retain a pattern of varying electric charge according to the manner in which it is inscribed by the radar writing beam. A reference map 5 indicates approximately the same pattern as shown by the radar. This reference map may be an ordinary photographic negative which indicates a map in terms of light and dark areas. Thus, for example, a particular terrain may be photographed on reference map 5 and later picked up by radar 3.

A flying spot scanner 6, such as used in an ordinary television station, and to which is connected a suitable deflection circuit 7, is positioned so as to project its beam of light through lens 8 and through reference map 5. The projected light after passing through the reference map continues through lens 9 which converges it on photoelectric cell 10. The flying spot scanner thus projects a beam of light that scans an area of the reference map in the manner familiar to the electronic art. This beam of light, on passing through reference map 5, will vary in its intensity due to the light and dark areas imprinted on the map. The projected light is converted by the photoelectric cell into an A.C. voltage; i.e., a video signal. This video signal will vary in its intensity acccording to the intensity of the light beam striking the photoelectric cell which in turn varies in accordance with the light and dark areas on the scanned portion of the reference map 5. Photoelectric cell 10 is connected to an amplifier 11 which serves to boost the video signal. It is generally desirable to provide additional amplification of the video signal by video power amplifier 12.

A reading beam high voltage supply 14 is also connected to the graphechon tube. Deflection circuit 15 is connected to the graphechon tube so that the reading beam progressively scans the area of storage plate 2 on the opposite side from where it is inscribed by the radar writing beam. Such a reading beam is operative to completely remove the charge from storage plate 2 if its intensity is equal to or greater than the intensity of the charge on the portion of the storage plate it contacts. If the intensity of the reading beam is less than the charge on the portion of the storage plate contacted, the reading beam will then discharge an amount proportional to the intensity of the charge on the plate in relation to the intensity of the reading beam.

The information from the flying spot scanner, which has become the video signal from amplifier 12, operates to modulate the reading beam. In this manner the intensity of the reading beam is made to vary in direct relationship to the variations in the intensity of the video signal. Because of this the reading beam will have an intensity equal to the intensity of the charge on the storage plate only in the portions contacted where the two maps correspond. Otherwise the intensity of the reading beam will not be that of the intensity of the charge on the storage plate and a charge will remain on certain areas of the storage plate after the reading beam has completely scanned its side of the storage plate. This is illustrated in FIGS. 2, 3 and 4. FIG. 2 shows storage plate 2 after the radar signal has recorded its map on the surface of the plate. The cross hatched area is the area that has received an electrical charge from the radar beam and may be, for example, a body of land detected by the radar beam. FIGURE 2 also shows the scanned portion of reference map 5 which, as mentioned above, may be a photographic negative illustrating substantially the same body of land as detected by the radar beam, which is represented by the cross hatched area on the map. The video signal hookup and the reading beam then, in effect, superimpose reference map 5 over storage plate 2, as illustrated in FIG. 3, comparing the relationship of the two maps scanned. As shown in this drawing, the two maps are not exactly matched. FIG. 4 illustrates the storage plate after the scanning operation by the reading beam has been completed. Thus area A in FIG. 3 where the two areas mapped coincide is removed by the reading beam, while area B where the two maps were not matched remains on the storage plate.

Before the radar again writes a picture on the graphechon storage plate the reading beam again scans its side of the storage plate, but this time unmodulated by the video signal. This second scanning by the reading beam removes area B and leaves the storage plate blank, ready for the radar writing beam to write another map on the storage plate as the cycle is repeated. The electrical charge representing area B is fed from the graphechon tube through circuit 16, including resistor 17, into an integrator 18. A useable voltage is produced by the integrator which acts to sum up the charge removed from the graphechon tube by the second scanning cycle of the reading beam. This voltage is proportional to the amount of mismatch between the radar map and the reference map and may be used in any desired manner.

It is normally desirable to cover various areas of reference map 5 by the scanning of the flying spot scanner. Thus the raster of the flying spot scanner may initially cover area C of the reference map as illustrated in FIG. 5. At this position of the flying spot scanner beam there will be produced a certain voltage from the integrator in the manner described above, which is a function of the relationship of reference map area C to the radar map. It is then possible to deflect the beam of the flying spot scanner so that it covers area D of the reference map on its next scanning cycle (see FIG. 6). This deflection may be accomplished by means of a suitable positioning circuit 20. The voltage and polarity of the charge applied to the positioning circuit may be observed so that the exact amount of deflection and the exact position of the raster of the flying spot scanner beam are known. Again the voltage from the integrator indicates the amount of mismatch between the two maps, but this time for area D covered by the flying spot scanner. Similarly the flying spot scanner beam may be deflected so as to cover area E and area F of the reference map as shown in FIGS. 7 and 8.

Positions E and F of the raster are thus the positions of horizontal or left-right deflection of the flying spot scanner beam, while positions C and D are the positions vertical or up-down deflection. At any given instant the horizontal positioning voltage is proportional to the horizontal position of the flying spot scanner raster, the vertical positioning voltage will similarly show the vertical position of the raster, while the integrator output reveals the amount of displacement between the two maps scanned. Suitable comparison circuits 21 and 22 for the left-right and up-down position respectively of the flying spot scanner raster may be included in this apparatus. Switching means, indicated at 23 and preferably an automatic electronic switching arrangement, will connect the integrator to the comparison circuits. These two comparison circuits will act to compare the instantaneous up-down and left-right position of the raster of the flying spot scanner with the integrator output, which will thereby indicate the amount of displacement and direction of displacement between the two maps scanned. The voltages thus obtained from the left-right and up-down comparison circuits may then be fed to positioning circuit 20, which may be in the form of a servo type loop, where it is used to reposition the flying spot scanner beam horizontally and vertically to a position where the raster of the flying spot scanner covers an area of the reference map more nearly coinciding to the map recorded on the storage plate. The positioning voltage will continue to position and reposition the flying spot scanner raster in this manner until the integrator output reaches a minimum value. In other words, by these circuits the area of the reference map scanned by the flying spot scanner will be automatically matched (or very nearly so) to the image recorded on the graphechon storage plate by the radar writing beam.

A synchronizer 26 should be included in the circuit to synchronize the positioning and deflection of the flying spot scanner beam, the reading beam and the radar writing beam. Thus the output of the integrator will always be matched with the corresponding position of the flying spot scanner and the radar writing beam, and the reading beam will be regulated so that the reading beam can complete its scanning operations as described above before the writing beam has again recorded an image on the storage plate.

With suitable modifications of the integrator circuit, comparison circuits and synchronizer, this apparatus can be arranged so that the reading beam scans the storage plate several times between inscriptions of a map thereon by the writing beam. In such cases the reading beam should be modulated by the video signal every time it scans the storage plate, and the intensity of the reading beam should be such as to remove only a small portion of the charge on the storage plate during each scanning cycle, even in the portions where the radar map and the reference map are matched, so as to permit many scanning cycles by the reading beam for each radar map recorded. The raster of flying spot scanner may be positioned to cover various portions of the reference map in the manner described in detail above. A position where the two maps are exactly matched will be indicated by a sharp increase in the amount discharged from the storage plate and this decided increase for a matched position will be present even after numerous scannings by the reading beam. This arrangement has the advantage of increased speed in comparing the two maps because it does not require a delay between reading beam cycles for allowing the writing beam to record a new inscription on the storage plate.

The foregoing detailed description is to be clearly understood as by way of illustration only and not by way of limitation, the spirit and scope of this invention being limited only by the appended claims.

I claim:

1. In combination with a radar device, means connected with said radar for storing in terms of electric charge signals produced by said radar; a reference map; means operatively connected with said reference map for producing an electric charge proportional to information inscribed on said map; and means operatively connected with said lastly mentioned means and said storing means for comparing said electric charges and producing a voltage proportional to the difference therebetween.

2. An apparatus for determining the relative displacement of two maps comprising an electronic storage device; means for inscribing a map thereon in terms of electrical charge; a reference map in terms of light and dark areas; means for projecting a scanning beam of light through said reference map; means for converting the projected light into voltage; said lastly mentioned means being interconnected with said electronic storage device and arranged to scan said device for removing the electrical charge therefrom.

3. An apparatus as recited in claim 2 in which said electronic storage device is a graphechon tube, and including in addition means for measuring the charge removed from said graphechon tube.

4. An apparatus for determining the relative relationship of two maps comprising a graphechon tube, said tube including a storage plate; radar means interconnected with said graphechon tube for inscribing a map on said storage plate in terms of relative intensity of electric charge; a reference map defined in terms of light and dark areas; a flying spot scanner for projecting a scanning beam of light through portions of said reference map; a photoelectric cell for converting said projected light into an electric charge; means interconnecting said photoelectric cell and said graphechon tube; and means for removing said charge on the storage plate in proportion to the intensity of said electric charge from the photoelectric cell compared with the intensity of electric charge inscribed in said storage plate by said radar means.

5. A device as recited in claim 4 including in addition means operative for positioning said flying spot scanner beam for scanning a predetermined portion of said reference map; means for determining the displacement between said area of the reference map and said radar map; and means for repositioning said flying spot scanner beam for reducing the displacement between the area of the reference map scanned and said radar map.

6. An apparatus for determining the relative relationship of two maps comprising a graphechon tube, said tube including a storage plate; radar means for progressively inscribing a map on said storage plate in terms of relative intensity of electric charge; a reading beam source interconnected with said graphechon tube and arranged to scan said storage plate; a reference map defined in terms of light and dark areas; a flying spot scanner for progressively scanning portions of said reference map and projecting light therethrough, said projected light being thereby varied in intensity according to said light and dark areas; a photoelectric cell arranged to receive said projected light and convert said projected light into an electric charge varying in intensity according to the variations in intensity of said projected light; means interconnecting said photoelectric cell and said graphechon tube whereby the electric charge from said photoelectric cell modulates said reading beam, said reading beam thereby being operative to remove the electric charge from said storage plate according to the voltage emitted by said photoelectric cell; and an integrator connected with the graphechon tube for receiving an electric charge removed from said storage plate by said reading beam.

7. A device as recited in claim 6 including in addition a synchronizer so arranged that said reading beam first scans said storage plate to remove the electrical charge therefrom proportional to the intensity of said voltage from said photoelectric cell, and said reading beam subsequenty scans said plate to remove the remaining charge therefrom, said remaining charge being fed to said integrator for producing an output voltage.

8. An apparatus as recited in claim 6 including in addition a positioning circuit for positioning said flying spot scanner beam for scanning a predetermined portion of said reference map, and comparison circuits for comparing the position of said portion of the reference map with the integrator output for thereby determining the amount and direction of displacement of said maps as scanned.

9. An apparatus for determining the relative relationship of two maps comprising a reference map defined in terms of light and dark areas; a flying spot scanner for progressively projecting a beam of light through said reference map; a photoelectric cell positioned to receive said projected light and convert said light into voltage; a graphechon tube, said tube including a storage plate; radar means connected with said graphechon tube, for recording a map on said storage plate in terms of electric charge; a reading beam source connected with said graphechon tube for scanning said storage plate; means interconnecting said photoelectric cell and said graphechon tube for modulating said reading beam on one scanning cycle, said reading beam thereby removing the charge from said storage plate proportional to the voltage emitted by said photoelectric cell, said reading beam on the next scanning cycle removing the remaining charge on said storage plate; and an integrator connected with said graphechon tube for providing a voltage proportional to said remaining charge.

10. An apparatus as recited in claim 9 including in addition a positioning circuit for positioning said flying spot scanner beam for scanning a predetermined portion of said reference map; and comparison circuits for comparing the position of said portion of the reference map with the integrator output for producing a voltage proportional to the amount and direction of displacement between said maps as scanned, said comparison circuits being connected with said positioning circuit whereby said voltage is utilized by said positioning circuit for repostioning said flying spot scanner beam for reducing the displacement between the map on said storage plate and the portion of said reference map scanned by said flying spot scanner.

References Cited in the file of this patent

UNITED STATES PATENTS

| | | |
|---|---|---|
| 2,422,295 | Eaton | June 17, 1947 |
| 2,506,127 | Allen | May 2, 1950 |
| 2,508,562 | Bonner | May 23, 1950 |
| 2,526,682 | Mulberger et al. | Oct. 24, 1950 |
| 2,528,202 | Wolff | Oct. 31, 1950 |
| 2,539,901 | Ewing | Jan. 30, 1951 |
| 2,586,743 | Thresher et al. | Feb. 19, 1952 |
| 2,655,650 | Marshall | Oct. 13, 1953 |